(12) United States Patent
VanEpps

(10) Patent No.: US 9,783,122 B1
(45) Date of Patent: Oct. 10, 2017

(54) LIGHT BRACKET FOR USE ON TRUCK GRILLE

(71) Applicant: Randy VanEpps, Watertown, NY (US)

(72) Inventor: Randy VanEpps, Watertown, NY (US)

( * ) Notice: Subject to any disclaimer, the term of this patent is extended or adjusted under 35 U.S.C. 154(b) by 317 days.

(21) Appl. No.: 14/732,748

(22) Filed: Jun. 7, 2015

Related U.S. Application Data

(60) Provisional application No. 62/109,320, filed on Jan. 29, 2015.

(51) Int. Cl.
*B60Q 1/02* (2006.01)
*B60R 11/00* (2006.01)
*B60Q 1/28* (2006.01)
*B60Q 1/26* (2006.01)

(52) U.S. Cl.
CPC ............ *B60R 11/00* (2013.01); *B60Q 1/2615* (2013.01); *B60Q 1/28* (2013.01); *B60R 2011/005* (2013.01); *B60R 2011/0008* (2013.01)

(58) Field of Classification Search
CPC ...... B60Q 1/2661; B60Q 1/0035; B60Q 1/28; B60R 2011/008; F21V 15/013; F21V 21/005; F21S 8/10
See application file for complete search history.

(56) References Cited

U.S. PATENT DOCUMENTS

| 6,238,070 | B1 | 5/2001 | Galiner et al. | |
|---|---|---|---|---|
| 6,709,137 | B1 | 3/2004 | Glovak et al. | |
| 6,764,206 | B1 | 7/2004 | Felty | |
| 6,824,298 | B2 | 11/2004 | Childs | |
| 7,147,355 | B1 * | 12/2006 | Kiler ................... | B60Q 1/2661 362/496 |
| 7,204,626 | B2 | 4/2007 | Elwell | |
| 2012/0281426 | A1 | 11/2012 | Polka et al. | |
| 2016/0288700 | A1 * | 10/2016 | Chen ................... | B60Q 1/0035 |

FOREIGN PATENT DOCUMENTS

JP            362094450 A      4/1987

* cited by examiner

*Primary Examiner* — Karabi Guharay
(74) *Attorney, Agent, or Firm* — IP Law Leaders PLLC

(57) ABSTRACT

A first LED lamp bracket is provided that can be fixed to an interior portion of a front grille section that is part of an engine hood assembly of a motorized vehicle. The LED lamps are located on the LED lamp bracket such that they are clearly visible through the engine hood front grille assembly. The LED lamp bracket assembly is designed such that it takes advantage of the spacing of the grille openings such that the LED lamps are visible when the LED lamp bracket is attached to the motorized vehicle. The first LED lamp bracket can be used with a 2014 Ford F150 truck. According to further aspects of the embodiments, a second LED lamp bracket assembly is provided that includes substantially identical design features, but which is fitted to a 2015 Ford F150 truck.

19 Claims, 7 Drawing Sheets

LIGHT BRACKET FOR USE ON TRUCK GRILLE

PRIORITY INFORMATION

The present application claims priority under 35 U.S.C. §119(e) to U.S. Provisional Patent Application Ser. No. 61/109,320, filed 29 Jan. 2015, the entire contents of which are expressly incorporated herein by reference.

TECHNICAL FIELD

The embodiments described herein relate generally to accoutrements for motor vehicles, and more specifically to systems, methods, and modes for providing a bracket that can hold a plurality of lights that makes the motor vehicle more visible, and hence safer to operate.

BACKGROUND

Increased visibility of automobiles, including trucks, leads to greater safety of operation. It is a much common sense, as it is has been verified by numerous safety studies, that automobiles that have their lights on are less likely to be involved in accidents due to other drivers or pedestrians not seeing them. Unfortunately, many people today have become altogether too distracted, and sometimes the "ordinary" daytime running lights are no longer enough to make the traveling automobile stand out. Others have tried to create devices to make the vehicles stand out for safety and other reasons.

U.S. Pat. No. 6,238,070, to Galliner et al., allegedly describes an arrangement with special lights for a vehicle that has a stage with at least two headlights. The arrangement is fastened to the front portion of the vehicle and contains two types of holders. One of the holders is in the form of a quick connect and a part that projects outside the radiator grill. Accordingly, the arrangement can be mounted and dismounted from the vehicle.

U.S. Pat. No. 6,709,137 to Glovak, et al., allegedly describes a lighted running board assembly that has a mounting bracket and a framing network secured to such bracket. An illuminated step pad is secured to and supported by the framing network, and the step pad includes a light source, such as an LED, housed within a light housing member and disposed in a cavity of the framing network. Light is allegedly projected through a translucent surface of the step pad.

U.S. Pat. No. 6,764,206 to Felty, allegedly describes a single-bolt auxiliary light Bracket that can be provided in a variety of configurations to accommodate a variety of handlebar designs. The bracket will allegedly attach to an existing motorcycle structure with a single bolt. The device is still further provided with recessed grooves formed in its surface for allegedly retaining headlamp wiring and other non-aesthetically-pleasing appurtances there within.

U.S. Pat. No. 6,824,298 to Childs, allegedly describes a mounting bracket and method for quick coupling a hanging type light fixture to an electrical ceiling box. The mounting bracket allegedly serves as a lintel across the open base ceiling box by being securely fastened at each end. The bracket, having parallel sides, is sufficient in width and thickness to support the light fixture's weight, and contains parallel perpendicular flanges extending down each side, for rigidity. A slot containing a 180 degree arc, positioned near the center edge, is sufficient in size for immediate acceptance of the light fixture's nipple and nut, thus quick coupling the hanging fixture to the ceiling box.

U.S. Pat. No. 7,204,626 to Elwell, allegedly describes a lighted vehicle grille that includes a grille or grille insert mounted to the front of a vehicle with a plurality of lights mounted to the vehicle grille. The lights may be mounted within holes in the grille or may be otherwise attached to the grille. The lights are connectable to the electrical circuitry of the vehicle, and are allegedly adapted to turn on simultaneously with the selective turning on of other vehicle lights.

U.S. Published Patent Application No. 2012/0281426 by Polka et al., allegedly describes a light mounting system for a vehicle that includes a light mount surface with first and second ends defining a mounting area spanning there between and including first and second mounting brackets spaced along the light mount surface and extending from the light mount surface for positioning the light mount surface within a vehicle license plate mounting area. The light mount surface allegedly extends away from the vehicle when positioned within the vehicle license plate mounting area and receives a light fixture mounted thereto. The light mount surface may include a wire routing way to provide a routing path for routing wire from the light fixture. In one embodiment, the light mount surface includes a wire routing way that is allegedly defined by an opening on the light mount surface when the light mount system is positioned within the license plate mounting area and proximate to the bumper of a vehicle. In one embodiment, the license plate mounting area further allegedly includes apertures that align with apertures on the first and second mounting brackets to secure the light mounting system within the license plate mounting area on the vehicle.

Japanese Patent No. JP 362094450A describes a front side shield that allegedly improves the appearance of an automotive vehicle. The front side shield is divided into three portions and is laid between the head lamps and the radiator grill and is fixed to the radiator core supports.

There are certain problems, however, with the conventional systems/solutions/devices described above. Accordingly, it would be desirable to provide to systems, methods, and modes for providing a bracket that can hold a plurality of lights that makes the motor vehicle more visible, and hence safer to operate.

SUMMARY

An object of the embodiments is to substantially solve at least the problems and/or disadvantages discussed above, and to provide at least one or more of the advantages described below.

It is therefore a general aspect of the embodiments to provide a bracket that can hold a plurality of lights that cause the motor vehicle to appear more visible, and hence safer to operate that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect of the embodiments, a lamp bracket assembly for use with a motorized vehicle fashioned from a sheet of material is provided, the lamp bracket assembly comprising a top, substantially flat portion (114), a left side (110), a right side (112), and three lamp holding protrusions (102), of substantially isosceles triangle shape, located at a bottom portion of the lamp bracket assembly, each of the three lamp holding protrusions including respective lamp mounting holes (104), the location of the lamp holding holes and dimensions of the three lamp holding protrusions being such that to cause lamps (118) located in respective ones of the lamp holding holes to be visible through grille openings located on a hood assembly of the motorized vehicle when the lamp bracket assembly is attached to the grille of the motorized vehicle.

According to the first aspect of the embodiments, the lamp bracket further comprises a plurality of lamp bracket assembly mounting holes (106) located such that their position on the lamp bracket assembly provides for the lamp bracket assembly to be mounted on the motorized vehicle to allow the lamps to be visible through grille openings on the hood assembly of the motorized vehicle, and wherein each of the plurality of lamp bracket assembly mounting openings (106) comprises a slot, wherein each of the slots is characterized by a long dimension of about 0.875" substantially parallel with the top, substantially flat portion of the lamp bracket assembly and the slot further characterized by a short dimension of about 0.313" substantially perpendicular to the top substantially flat portion of the lamp bracket assembly, and wherein first and second slots are located about 11.688" from each other, and are substantially symmetrically located about a center line of the lamp bracket assembly, and further wherein the first and second slot are located about 0.594" from the top substantially flat portion of the lamp bracket assembly.

According to the first aspects of the embodiments, the lamp bracket assembly further comprises a bottom portion (116), the bottom portion being substantially parallel to the substantially flat top portion, and wherein each of the lamp holding protrusions are substantially equidistantly located from each other at a distance of about 6.781", protrude outwardly in a planar manner from the bottom portion, and are substantially symmetrically located about a center line of the lamp bracket assembly, and further wherein the two substantially similar length sides of the lamp holding protrusions are formed at an angle of about 30° with respect to a base side of the isosceles shaped lamp holding protrusion that is also substantially parallel to, and in line with, the bottom portion of the lamp bracket assembly, and further wherein each of the lamp holding protrusions has a height of about 1.236" in reference to the bottom portion of the lamp bracket assembly.

According to the first aspect of the embodiments, each of the respective lamp mounting holes (104) are located about on a center line of their respective lamp holding protrusion, at a distance of about 1.938" from the top substantially flat portion of the lamp bracket assembly, and are substantially equidistantly located at about a distance of about 6.781" from each other, and still further wherein the bottommost portion of the lamp holding protrusion is formed at an angle of about 120°, with a radius of about 0.625".

According to the first aspects of the embodiments, the left side is substantially parallel to the right side, and each of the left and right sides are substantially perpendicular to the top portion of the lamp bracket assembly, and wherein the lamp bracket assembly is about 18" in length, and further wherein a height of the lamp bracket assembly, as measured from the top portion to each of the bottommost portion of the lamp holding protrusions is about 2.736", and still further wherein a distance from the top portion to the bottom portion is about 1.5", and still further wherein a diameter of each of the lamp mounting holes is about 0.75", and wherein the motorized vehicle comprises a 2014 Ford F150 pickup truck.

According to the first aspects of the embodiments, the lamp bracket assembly further comprises a pair of second bracket mounting holes, wherein each of the first and second bracket mounting holes are located about 11.686" apart from each, and are substantially symmetrically located about a center line of the lamp bracket assembly, and further wherein each of the pair of second bracket mounting holes are located about 1.125" from the top portion of the lamp bracket assembly, and further wherein each of the pair of second bracket mounting holes are about 0.375" in diameter, and still further wherein the motorized vehicle is selected from the group consisting of 2014 Ford Platinum, Limited, and King Ranch model F150s.

According to the first aspect of the embodiments, the lamp bracket assembly further comprises a lamp lighting harness assembly that includes a plurality of light emitting diodes (LEDs) lamps, a plurality of wires carrying direct current voltage and return ground to each of the LED lamps, and further wherein the lamp harness assembly can connect each of the LED lamps to a first processor based controller, wherein the controller is adapted to cause the LED lamps to illuminate in certain patterns.

According to a second aspect of the embodiments, a lamp bracket assembly for use with a motorized vehicle fashioned from a sheet of material is provided, the lamp bracket assembly comprising a top, substantially flat portion (514), a left side (510), a right side (512), and three lamp holding protrusions (502), of substantially isosceles triangle shape, located at a bottom portion of the lamp bracket assembly, each of the three lamp holding protrusions including respective lamp mounting holes (504), the location of the lamp holding holes and dimensions of the three lamp holding protrusions being such that to cause lamps (118) located in respective ones of the lamp holding holes to be visible through grille openings located on a hood assembly of the motorized vehicle when the lamp bracket assembly is attached to the grille of the motorized vehicle.

According to the second aspect of the embodiments, the lamp bracket assembly further comprises or more lamp bracket mounting tabs (518), wherein, each of the one or more lamp bracket mounting tabs includes at least one lamp bracket assembly mounting openings (506) located such that their position on the lamp bracket assembly provides for the lamp bracket assembly to be mounted on the motorized vehicle to allow the lamps to be visible through grille openings on the hood assembly of the motorized vehicle, and wherein each of the plurality of lamp bracket assembly mounting openings (506) comprises a slot, wherein each of the slots is characterized by a long dimension of about 0.875" substantially perpendicular to the top substantially flat portion of the lamp bracket assembly and the slot further characterized by a short dimension of about 0.5" substantially parallel to the top substantially flat portion of the lamp bracket assembly, and wherein the first and second slots are located about 9.0" from each other and substantially symmetrically about a center line of the lamp bracket assembly, and further wherein the first and second slots are located about 0.6875" from the top substantially flat portion of the lamp bracket assembly.

According to the second aspect of the embodiments, each of the lamp bracket mounting tabs has an upper radius of about 0.625", a height of about 1.375", a width of about 1.5", are located at a distance of about 9.0" from each other, are substantially symmetrically located about a centerline of the lamp bracket assembly, and are substantially equidistantly located from respective left and right sides (510, 512). According to the second aspect of the embodiments, the lamp bracket assembly further comprises a bottom portion (516), the bottom portion substantially parallel to the substantially flat top portion, and wherein the lamp holding protrusions are substantially equidistantly located from each other, protruding in a planar manner from the bottom portion, at about 5.375", and are substantially symmetrically located about a center line of the lamp bracket assembly, and further wherein the two substantially similar length sides of the lamp holding protrusions are formed at an angle of about 30° with respect to a base side of the isosceles shaped lamp holding protrusion that is also substantially parallel to, and in line with, the bottom portion of the lamp bracket assembly, and further wherein each of the lamp holding protrusions has a height of about 1.25" in reference to the bottom portion of the lamp bracket assembly.

According to the second aspect of the embodiments, each of the respective lamp holding holes (504) are located on a center line of their respective lamp holding protrusion, and are substantially equidistantly located from each other at a distance of about 5.375", and still further wherein the bottommost portion of the lamp holding protrusion is formed at an angle of about 120°, with a radius of about 0.875", and wherein the left side is substantially parallel to the right side, and each of the left and right sides are substantially perpendicular to the top portion of the lamp bracket assembly, and wherein the lamp bracket assembly is about 16" in length, and further wherein a height of the lamp bracket assembly, as measured from the top portion to each of the lamp holding protrusions is about 2.0", and still further wherein a distance from the top portion to the bottom portion is about 0.75", and still further wherein a distance from the top portion to a center of each of the lamp mounting holes is about 1.125", and still further wherein, a diameter of each of the lamp mounting holes is about 0.75".

According to the second aspect of the embodiments, the motorized vehicle comprises a 2015 Ford F150 pickup truck, and the lamp bracket assembly further comprises a lamp lighting harness assembly that includes a plurality of light emitting diode (LED) lamps, a plurality of wires carrying direct current voltage and return ground to each of the LED lamps, and further wherein the lamp harness assembly can connect each of the LED lamps to a first processor based controller, wherein the controller is adapted to cause the LED lamps to illuminate in certain patterns.

According to a third aspect of the embodiments, a lamp bracket assembly (100) for use with a motorized vehicle fashioned from a sheet of material is provided, the lamp bracket assembly comprising a top, substantially flat portion (114), a left side (110), and a right side (112), wherein the left side is substantially parallel to the right side, and each of the left and right sides are substantially perpendicular to the top portion of the lamp bracket assembly, and further wherein the lamp bracket assembly is about 18" in length.

According to the third aspect of the embodiments, the lamp bracket assembly further comprises three lamp holding protrusions (102) of substantially isosceles triangle shape, located at a bottom portion of the lamp bracket assembly, each of the three lamp holding protrusions including respective lamp mounting holes (104), the location of the lamp holding holes and dimensions of the three lamp holding protrusions being such that to cause lamps (118) located in respective ones of the lamp holding holes to be visible through grille openings located on a hood assembly of the motorized vehicle when the lamp bracket assembly is attached to the grille of the motorized vehicle, two first bracket mounting holes (106) located such that their position on the lamp bracket assembly provides for the lamp bracket assembly to be mounted on the motorized vehicle to allow the lamps to be visible through grille openings on the hood assembly of the motorized vehicle, wherein each of the pair of first bracket mounting holes (106) comprises a slot, wherein each of the slots is characterized by a long dimension of about 0.875" substantially parallel with the top, substantially flat portion of the lamp bracket assembly and the slot further characterized by a short dimension of about 0.313" substantially perpendicular to the top substantially flat portion of the lamp bracket assembly, and wherein first and second slots are located about 11.688" from each other, and are substantially symmetrically located about a center line of the lamp bracket assembly, and further wherein the first and second slot are located about 0.594" from the top substantially flat portion of the lamp bracket assembly, and wherein the pair of first mounting holes is adapted to mount the lamp bracket assembly to a 2014 Ford F150 truck, a bottom portion (116), the bottom portion being substantially parallel to the substantially flat top portion, and a distance from the top portion to the bottom portion is about 1.5", and wherein each of the lamp holding protrusions are substantially equidistantly located from each other at a distance of about 6.781", protrude outwardly in a planar manner from the bottom portion, and are substantially symmetrically located about a center line of the lamp bracket assembly, and further wherein the two substantially similar length sides of the lamp holding protrusions are formed at an angle of about 30° with respect to a base side of the isosceles shaped lamp holding protrusion that is also substantially parallel to, and in line with, the bottom portion of the lamp bracket assembly, and further wherein each of the lamp holding protrusions has a height of about 1.236" in reference to the bottom portion of the lamp bracket assembly, and still further wherein each of the respective lamp mounting holes (104) are located about on a center line of their respective lamp holding protrusion, at a distance of about 1.938" from the top substantially flat portion of the lamp bracket assembly, and are substantially equidistantly located at about a distance of about 6.781" from each other, and wherein each of the lamp mounting holes has a diameter of about 0.75" and still further wherein the bottommost portion of the lamp holding protrusion is formed at an angle of about 120°, with a radius of about 0.625", and a height of the lamp bracket assembly, as measured from the top portion to a bottommost portion of each of the lamp holding protrusions is about 2.736".

According to the third aspect of the embodiments, the lamp bracket assembly further comprises a lamp lighting harness assembly (200) that includes three light emitting diodes (LEDs) lamps, and a plurality of wires carrying direct current voltage and return ground to each of the three LED lamps, and a pair of second bracket mounting holes (107), wherein the pair of second bracket mounting holes are located about 11.686" apart from each, and are substantially symmetrically located about a center line of the lamp bracket assembly, and further wherein each of the pair of second bracket mounting holes are located about 1.125" from the top portion of the lamp bracket assembly, and further wherein each of the pair of second bracket mounting holes are about 0.375" in diameter, and wherein the pair of second bracket mounting holes are adapted to mount the lamp bracket assembly to a motorized vehicle selected from the group consisting of 2014 Ford Platinum, Limited, and King Ranch model F150s, such that when so mounted using the second bracket mounting holes, the location of the lamp holding holes and dimensions of the three lamp holding protrusions are such that the lamps (118) located in respective ones of the lamp holding holes are visible through grille openings located on a hood assembly of one of the group of motorized vehicles when the lamp bracket assembly is attached to the grille of one of the motorized vehicles.

According to a fourth aspect of the embodiments, a lamp bracket assembly (500) for use with a motorized vehicle fashioned from a sheet of material is provided, the bracket assembly comprising a top, substantially flat portion (514), a left side (510), and a right side (512), and wherein the left side is substantially parallel to the right side, and each of the left and right sides are substantially perpendicular to the top portion of the lamp bracket assembly, and further wherein the lamp bracket assembly is about 16" in length.

According to the fourth aspect of the embodiments, the lamp bracket assembly further comprises three lamp holding protrusions (502) of substantially isosceles triangle shape, located at a bottom portion of the lamp bracket assembly, each of the three lamp holding protrusions including respective lamp mounting holes (504), the location of the lamp holding holes and dimensions of the three lamp holding protrusions being such that to cause lamps (118) located in respective ones of the lamp holding holes to be visible through grille openings located on a hood assembly of the motorized vehicle when the lamp bracket assembly is attached to the grille of the motorized vehicle.

According to the fourth aspect of the embodiments, the lamp bracket assembly further comprises two lamp bracket mounting tabs (518), wherein, each of the one or more lamp bracket mounting tabs includes at least one lamp bracket assembly mounting openings (506) located such that their position on the lamp bracket assembly provides for the lamp bracket assembly to be mounted on the motorized vehicle to allow the lamps to be visible through grille openings on the hood assembly of the motorized vehicle, and wherein each of the plurality of lamp bracket assembly mounting openings (506) comprises a slot, wherein each of the slots is characterized by a long dimension of about 0.875" substantially perpendicular to the top substantially flat portion of the lamp bracket assembly and the slot further characterized by a short dimension of about 0.5" substantially parallel to the top substantially flat portion of the lamp bracket assembly, and wherein the first and second slots are located about 9.0" from each other and substantially symmetrically about a center line of the lamp bracket assembly, and further wherein the first and second slots are located about 0.6875" from the top substantially flat portion of the lamp bracket assembly, and wherein each of the two lamp bracket mounting tabs has an upper radius of about 0.625", a height of about 1.375", a width of about 1.5", are substantially symmetrically located about a centerline of the lamp bracket assembly, and are substantially equidistantly located from respective left and right sides (510, 512), and wherein the two lamp bracket mounting tabs are adapted to mount the lamp bracket assembly to a 2015 Ford F150 truck.

According to the fourth aspect of the embodiments, the lamp bracket assembly further comprises a bottom portion (516), the bottom portion substantially parallel to the substantially flat top portion, and wherein each of the three lamp holding protrusions are substantially equidistantly located at a distance of about 2.375" from each other, protrude outwardly in a planar manner from the bottom portion, and are substantially symmetrically located about a center line of the lamp bracket assembly, and further wherein the two substantially similar length sides of the lamp holding protrusions are formed at an angle of about 30° with respect to a base side of the isosceles shaped lamp holding protrusion that is also substantially parallel to, and in line with, the bottom portion of the lamp bracket assembly, and further wherein each of the lamp holding protrusions has a height of about 1.25" in reference to the bottom portion of the lamp bracket assembly, and wherein each of the respective lamp holding holes (504) are located on a center line of their respective lamp holding protrusion, and are substantially equidistantly located from each other at a distance of about 5.375", and still further wherein the bottommost portion of the lamp holding protrusion is formed at an angle of about 120°, with a radius of about 0.875", and further wherein a height of the lamp bracket assembly, as measured from the top portion to each of a bottommost portion of the lamp holding protrusions is about 2.0", and still further wherein a distance from the top portion to the bottom portion is about 0.75", and still further wherein a distance from the top portion to a center of each of the lamp mounting holes is about 1.125", and still further wherein, a diameter of each of the lamp mounting holes is about 0.75".

According to the fourth aspect of the embodiments, the lamp bracket assembly further comprises a lamp lighting harness assembly (600) that includes three light emitting diodes (LEDs) lamps, and a plurality of wires carrying direct current voltage and return ground to each of the three LED lamps.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The above and other objects and features of the embodiments will become apparent and more readily appreciated from the following description of the embodiments with reference to the following Figures, wherein like reference numerals refer to like parts throughout the various Figures unless otherwise specified, and wherein.

DETAILED DESCRIPTION

Figure 1:
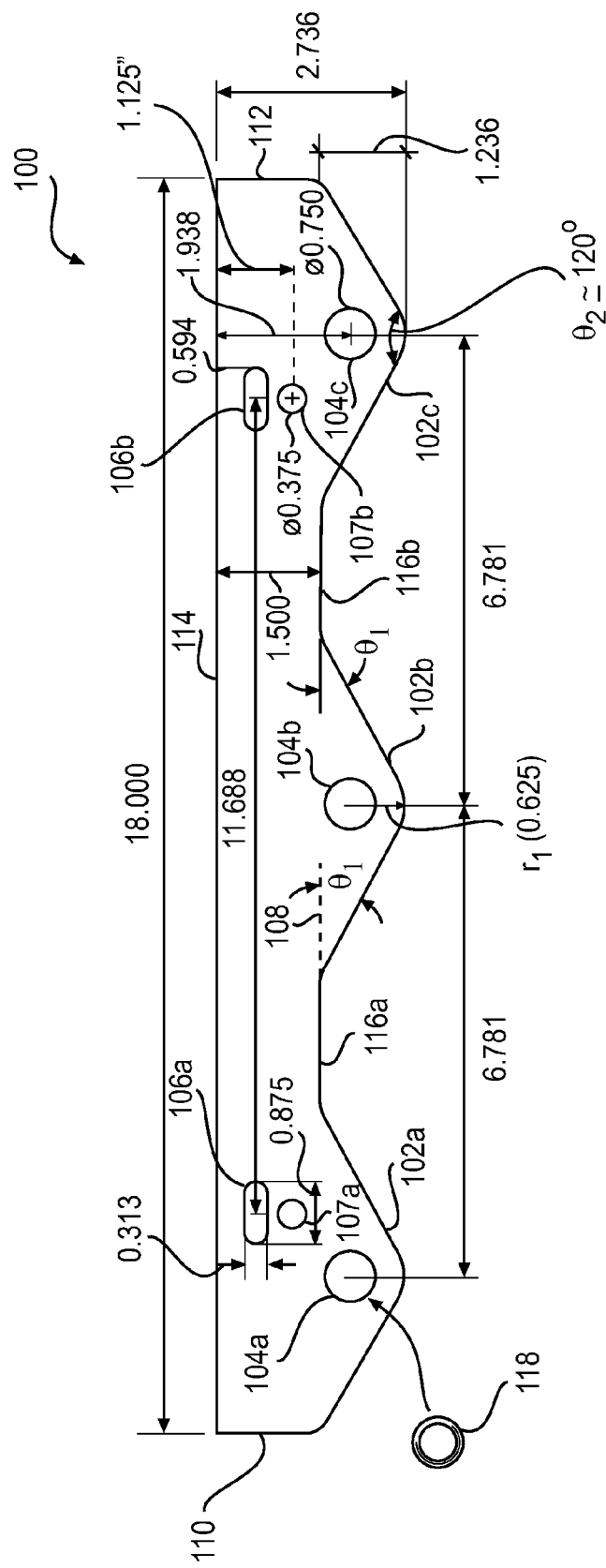
FIG. 1 illustrates a first lamp mounting bracket for use on a first truck according to aspects of the embodiments.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments can, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The following embodiments are discussed, for simplicity, with regard to the terminology and structure of a lamp bracket for use on a particular motor vehicle. However, the embodiments to be discussed next are not limited to these particular uses, but can be used on a plurality of other motor vehicles.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics can be combined in any suitable manner in one or more embodiments.

According to embodiments, the problems described above can be addressed by, for example, a first LED lamp bracket (though other types of lamps can be used) that can be fixed to an interior portion of a front grille section that is part of an engine hood assembly of a motorized vehicle. According to aspects of the embodiments, the motorized vehicle is a 2014 Ford F150 truck. The LED lamps, which can include any number, but according to an aspect of the embodiments, number three LEDs, are located on the LED lamp bracket such that they are clearly visible through the engine hood front grille assembly. The LED lamp bracket assembly is designed such that it takes advantage of the spacing of the grille openings to provide a path for the LED lamps to be visible, and also for mounting and attachment purposes. According to further aspects of the embodiments, a second LED lamp bracket assembly is provided that includes substantially identical design features, but which is fitted to a 2015 Ford F150 truck.

Used throughout the specification are several acronyms, the meanings of which are provided as follows:
ASIC Application Specific Integrated Circuit
BIOS Basic Input/Out System
CD Compact Disc
DVD Digital Versatile Disk
EEPROM Electrically Erasable Programmable Read Only Memory
FPGA Field Programmable Gate Array
HDD Hard Disk Drive
LED Light Emitting Diode
PCB Printed Circuit Board
RAM Random Access Memory
ROM Read-Only Memory
UVPROM Ultra-Violet Programmable Read Only Memory The following is a list of the elements of the Figures in numerical order:
100 (2014 Ford) Truck Lamp Bracket, First
102 Lamp Holding Protrusion
104 Light Emitting Diode (LED) Lamp Mounting Hole (Lamp Mounting Hole)
106 First Bracket Mounting Hole (First Mounting Hole)
107 Second Bracket Mounting Hole (Second Mounting Hole)
108 Lower Reference Line
110 Left Side
112 Right Side
114 Top Portion
116 Bottom Portion
118 LED Lamp
200 Wiring Harness First Bracket
202 Outer Shield First Bracket
204 Lamp Cable First Bracket
206 Harness Mounting Clamp Assembly First Bracket
302 Truck Front Grille Interior Portion
304 Truck Hood Fascia
306 Truck Grille Mounting Bolts
308 Truck Engine Hood
310 Fascia Column
400 2014 Ford F150 Truck
402 Windshield
404 Headlamp
406 First Lower Outer Fascia
408 Second Lower Outer Fascia
410 Fog Lamp
412 Tires
414 Grille Opening
416 Grille Fascia Row
500 (2015 Ford) Truck Lamp Bracket, Second
502 Lamp Holding Protrusion
504 LED Lamp Mounting Hole
506 Bracket Mounting Hole
508 Lower Reference Line
510 Left Side
512 Right Side
514 Top Portion
516 Bottom Portion
518 Bracket Mounting Tab
600 Wiring Harness Second Bracket
602 Outer Shield Second Bracket
604 Lamp Cable Second Bracket
606 Harness Mounting Clamp Assembly Second Bracket FIG. 1 illustrates first lamp mounting bracket (lamp bracket) 100 for use on a first truck such as a 2014 Ford F150 truck according to aspects of the embodiments. Lamp bracket 100, as briefly described above, can be used to hold a plurality of lamps in order to make the vehicle to which it is attached more visible during the day and night. According to an aspect of the embodiments, light emitting diodes (LEDs) can be used as the lamps, as they draw relatively little power, last a very long time, and generate a very bright and visible light. One such non-limiting example of an LED is LED assembly part number 534BAK, manufactured by Blazer International, of Long Grove, Ill., 60047. The LED of the assembly with part number 534Bak is rated at 12 volts, 0.02 amps, and meets the requirements of Federal Motor Vehicle Safety Standard 108 (FMVSS 108) and is PC rated (i.e., it has a 90° viewing angle). As those of skill in the art can appreciate, FMVSS 108 regulates all automotive lighting, signaling and reflective devices in the United States. FMVSS 108 is administered by the United States Department of Transportation's National Highway Traffic Safety Administration.

Lamp bracket 100, as described herein, and which the drawings included herein will show, is designed to be used with a 2014 Ford F150 truck; however, as can be appreciated by those of skill in the art, lamp bracket 100 can be used with other trucks and cars, or even other motorized vehicles, such as construction equipment, boats, snowmobiles, and the like.

Lamp bracket 100 (and lamp bracket 500, described below in regard to FIGS. 5 and 6), can be made of steel, anodized aluminum, plastic, or other materials. The material lamp bracket 100 is constructed from need only be sufficiently strong to be relatively rigid, and to be able to securely hold the lamps; as those of skill in the art can appreciate, lamp bracket 100 will be subjected to a strong force generated from the oncoming air as the motorized vehicle to which it is attached travels.

Lamp bracket 100 comprises substantially planar top portion 114, left side 110, right side 112, bottom portions 116a,b, and lamp holding protrusions 102a-c. According to aspects of the embodiments, left side 110 is substantially parallel to right side 112, and each of left and right sides 110, 112, are substantially perpendicular to top portion 114 and bottom portions 116a,b of lamp bracket 100. Lamp bracket 100 further includes first mounting holes 106a,b, and second mounting holes 107a,b. Second mounting holes 107 allow for lamp bracket 100 to be used on different models of 2014 Ford trucks, such as the Platinum, Limited, and King Ranch model F150s. There are three lamp holding protrusions 102a,b,c, and each are formed as shown in a substantially isosceles triangle fashion, with a lamp mounting hole 104a, b,c located in a central location, with the dimensions shown, in each of the respective lamp holding protrusions 102a,b,c. Lamps 118 can be fit into each of the lamp mounting holes 104a-c, as shown and described in regard to FIG. 2.

As shown in FIG. 1 and several other drawings, and described herein, lamp bracket 100 includes several different features. Lamp bracket 100 is shown and described according to aspects of the embodiments as incorporated a certain specific number of these components. For example, according to aspects of the embodiments, there are three lamp holding protrusions 102a-c, three lamp mounting holes 104a-c, two first mounting holes 106a,b, and two second mounting holes 107. Those of skill in the art should appreciate that the aspects of the embodiments are not limited to these specific numbers of the features of lamp bracket 100; that is, other combinations of numbers of these and other components/features are considered to be within the scope of the aspects of the embodiments.

Lamp bracket 100 can be used with a specific vehicle, such as a 2014 Ford 150 truck, though other uses are possible and should be considered to be included in various aspects of the embodiments. As lamp bracket 100 is designed to be used with a 2014 Ford F150 truck, the dimensions shown in FIG. 1 have been selected so that light emitting diode (LED) lamps 118 are located in openings in the front hood grille of the 2014 Ford 150 truck, and can be substantially clearly seen at great distances (about 500 feet), thereby providing enhanced visibility. As those of skill in the art can appreciate, other types of lamps can be used, including, but not limited to, incandescent bulbs, halogen, among others. In lamp bracket 100 there are shown several holes for mounting and holding items; according to aspects of the embodiments, each of the holes used and illustrated can be in the form of a substantially circular, oval, or slot-shaped hole. In addition, non-limiting examples are provided herein of distances between these holes and various other components or parts of lamp bracket 100; it is to be understood that unless otherwise stated, such distances are taken from a center point of the hole to the particular feature or portion of the lamp bracket 100 that is being used as a reference point.

Thus, the overall length of lamp bracket 100 is about 18", and can range from about 16.2" to about 19.8". The height of lamp bracket 100 is about 2.736" and can range from about 2.4624" to about 3.0096". The distance between first mounting holes 106a and 106b is about 11.688" and can range from about 10.519" to about 12.8568". The lengths of each of the first mounting holes 106a,b (in this case, slots) is about 0.875" and can range from about 0.7875" to about 0.9625". The height of each of the first mounting holes 106 is about 0.313" and can range from about 0.2817" to about 0.3443". Each of first mounting holes 106a,b are located about 0.594" from the uppermost portion of top portion 114, and the location can range from about 0.5346" to about 0.6534" from the uppermost portion of top portion 114 of lamp bracket 100. Second mounting holes 107a,b are about 0.375" in diameter, and the diameter can range from about 0.3375" to about 0.4125". Each of second mounting holes 107a,b are located a distance of about 1.125 "from top portion 114 and this distance can range from about 1.0125" to about 1.2375".

In addition, as lamp bracket 100 is substantially symmetrical, both first and second mounting holes 106, 107 are substantially symmetrically located about an imaginary center line (not shown). Further still, because of this symmetry, lamp mounting holes 104a,c are substantially symmetrically located about the imaginary center line that runs through about the center of lamp mounting hole 104b. According to further aspects of the embodiments, lamp mounting holes 104a,c are located at a distance of about 6.781" from the imaginary center line and a center point of lamp mounting hole 104b, and this distance can range from about 6.1029" to about 7.4591". Thus, due to this symmetry, each of first and second mounting holes 106, 107, and holes 104a,c are also substantially equally distantly located from left and right sides 110, 112, respectively.

The peaks of each of lamp holding protrusions 102a-c are rounded, with a radius $r_1$ of about 0.625", and $r_1$ can range from about 0.5625" to about 0.6875". The peaks of each of lamp holding protrusions 102a-c are formed at an angle $\Theta_2$ of about 120°, and $\Theta_2$ can range from about 108° to about 132°. The sides of lamp holding protrusions 102a,b,c are formed at an angle $\Theta_1$ of about 30° with respect to lower reference line 118, which is substantially co-linear with bottom portion 116. The angle $\Theta_1$ can range from about 27° to about 33°. The height of each of each of protrusions 102a-c is about 1.236" and this height can range from about 1.1124" to about 1.3596". Lamp mounting holes 104a,b,c have a diameter of about 0.75", and this diameter can range from about 0.675" to about 0.825". Each of the lamp mounting holes 104a,b,c are located at about a distance of about 1.938" from the uppermost surface of top portion 114 as shown in FIG. 1, and this distance can range from about 1.7442" to about 2.1318". The distance from the uppermost surface of top portion 114 to bottom portion 116 is about 1.5", and this distance can range from about 1.35" to about 1.65". According to an aspect of the embodiments, lamp bracket 100 is made from aluminum, and is about 0.063" in thickness; the thickness of lamp bracket can range from about 0.063"+/−about 10% in thickness to about 0.1250" in thickness+/−about 10% in thickness. According to further aspects of the embodiments, different plastics (or other materials) can also be used to manufacture lamp bracket 100, as those of skill in the art can appreciate that different types of plastic would have the requisite hardness and stiffness, as described above.

Figure 2:
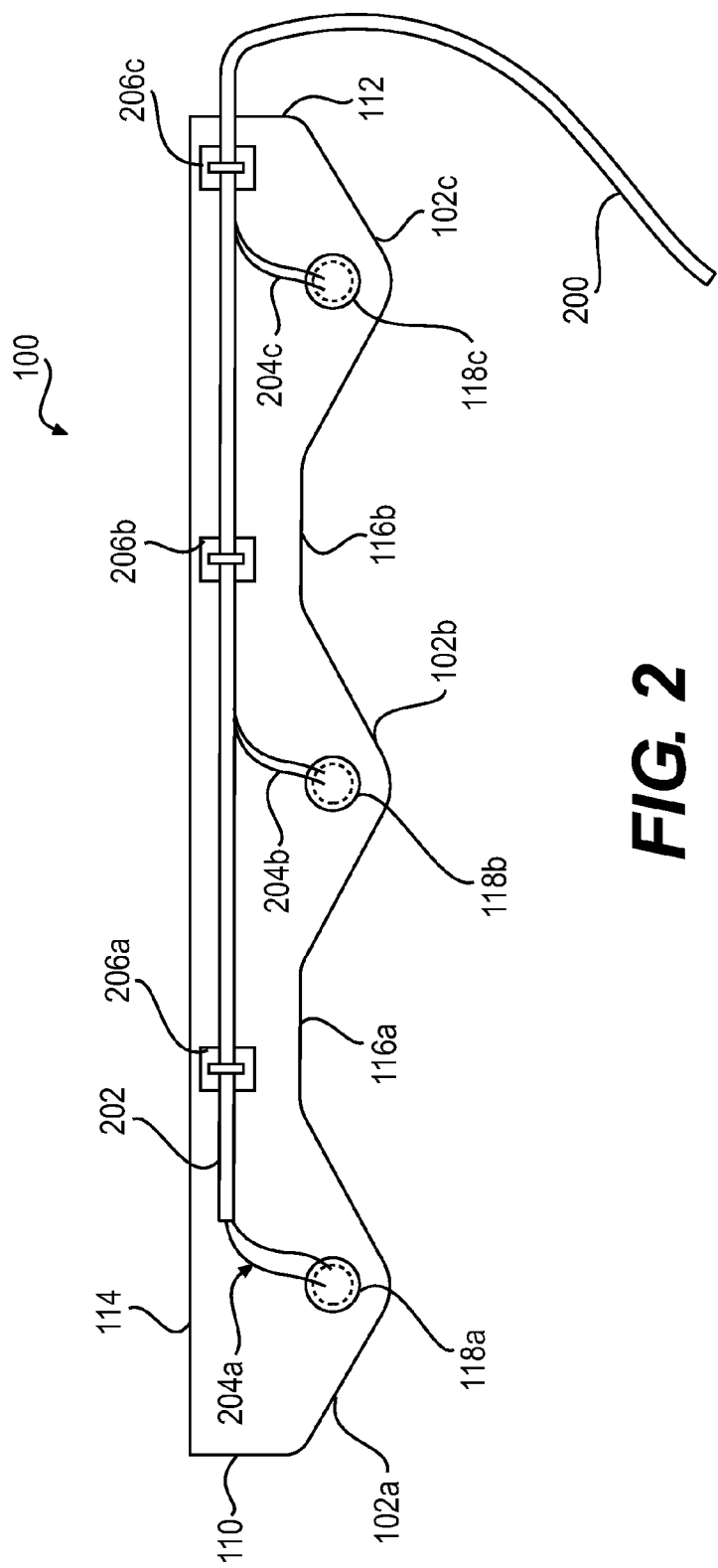
FIG. 2 illustrates the first lamp mounting bracket of FIG. 1 with a harness assembly according to aspects of the embodiments.

FIG. 2 illustrates lamp bracket 100 with wiring harness assembly (wiring harness) 200 according to aspect of the embodiments. Wiring harness 200 carries voltage, typically +12 volts (V) direct current (DC), and return ground to each LED lamp assembly 118 located on lamp bracket 100. Wiring harness 200 comprises outer shield 202 and lamp cables 204a-c; as those of skill in the art can appreciate, there can be three separate cables 204 contained within wiring harness 200, all of which can be located within outer shield 202 and connected together appropriately at a source voltage and ground point within the engine compartment of the motorized vehicle. Or, as those of skill in the art can further appreciate, wiring harness 200 can comprises a single pair of appropriately sized wires that are spliced at the appropriate points to create each of the separate lamp cables 204a-c. The former arrangement has the advantage of being able to switch each of the LED lamps on/off separately from each other, which can be a desired feature (e.g., they can blink in unison, or separately, in patterns, or simply be turned on and off collectively). These features are described in greater detail below. The latter arrangement is a less costly item to manufacture and implement within wiring harness 200, but in this case LED lamps 118 can only be turned on/off together. Wiring harness 200 further includes a plurality of harness mounting clamp assemblies 206 that include an adhesive-backed base portion and a cable-tie securing portion to which a cable tie can be secured thereto to keep wiring harness 200 fixed in place on lamp bracket 100, in a manner known to those of skill in the art. In use, an installer would remove a non-stick piece of paper off the surface with the adhesive, and affix the base portion to an appropriate location on lamp bracket 100. Wiring harness 200 is then located close to the base portion, and a cable tie is wrapped around it and through the securing portion of the base portion, and tightened. According to further aspects of the embodiments, outer shield 202 can be a plastic, or nylon sleeve, or can be made of some other suitable material, such as a shrink-wrap cable. Water-proofing materials can also be applied in a manner known to those of skill in the art at appropriate locations to protect the terminals of LED lamps 118.

Each of LED lamp mounting holes 104a-c are of such appropriate size such that LED lamps 118a-c can be press fit into each of them. Alternatively, other type of LED lamps 118 can include a rubber or nylon washer (or one made from other materials), grommet, and nut assembly, such that the grommet is first located into a particular mounting hole 104, washers are located on a front and rear side of lamp bracket 100, and the LED lamp is inserted through mounting hole 104. A nut can then be placed on a threaded portion of the LED lamp and tightened appropriately. These and other means for mounting LED lamps 118 to lamp bracket 100 are considered to be within the scope of the various aspects of the embodiments.

For example, lamp bracket 100 can be an assembly made up of several components: a mounting portion, a printed circuit board (PCB) portion, and a shield/weather-proofing portion or cover. These components can be attached to each with nuts and bolts, or screws, or in other manners so that they are effectively kept together as an assembly. LED lamps 118 can be attached to the PCB through conventional PCB manufacturing techniques, and the PCB can further include circuit conduits (or "runs") manufactured through known processes. The circuit conduits can provide voltage and ground to LED lamps 118 from an interconnection located on the PCB to which mating connector (from a supply cable) can be attached. The shield layer can be a separate physical shield, with substantially waterproof and weatherproof characteristics, such that the PCB is effectively shielded from water, dirt, dust and other detritus that can damage LED lamps 118 and the PCB. Although the individual manufacturing techniques are known to those of skill in the art, the implementation of the components and their physical location and placement are in accordance with the various aspects of the embodiments.

Figure 3:
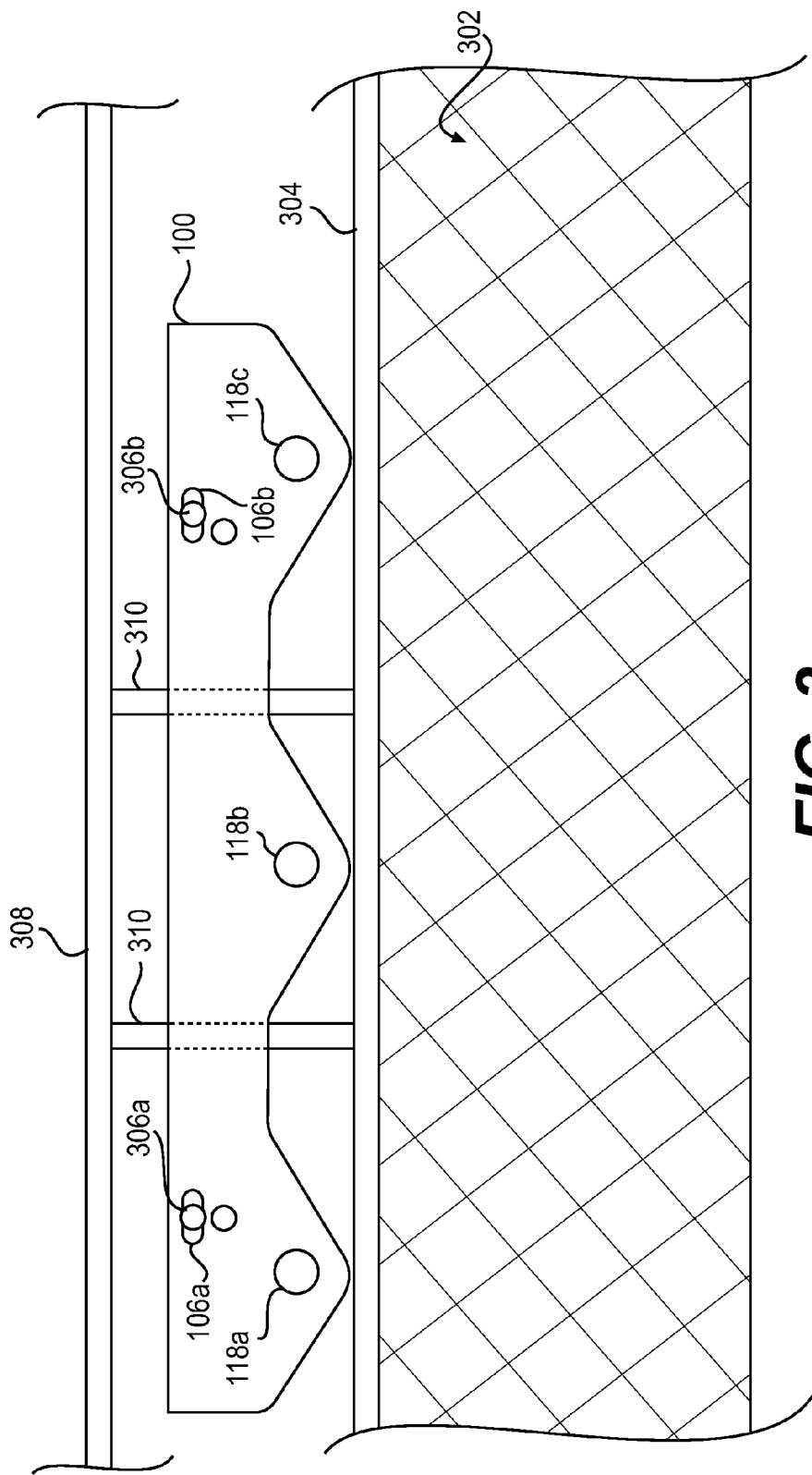
FIG. 3 illustrates assembly of the of the first lamp mounting bracket onto a grille area of a truck hood as viewed from an engine compartment according to aspects of the embodiments.

FIG. 3 illustrates assembly of first lamp mounting bracket 100 onto a grille area of a truck hood as viewed from an engine compartment according to aspects of the embodiments. The view of FIG. 3 is taken from inside the engine compartment of the motorized vehicle (e.g., a 2014 Ford F150 truck), at the intersection of the portion of the hood assembly where metal engine hood 308 is attached to the truck front grille portion (grille portion) 302. Grille portion 302 is located below and connected to truck hood fascia (fascia) 304 as shown in FIG. 3, and fascia 304 contains a plurality of columns 310 and rows—the latter being viewable from an external view, as in FIG. 4); the arrangement of grille portion 302, fascia 304, and columns 310 are done in a manner that is meant to be not only aesthetically pleasing, but also functional in that air must pass through grille portion 302 to get to the motorized vehicle's radiator, also located in the engine compartment, as known to those of skill in the art.

Figure 4:
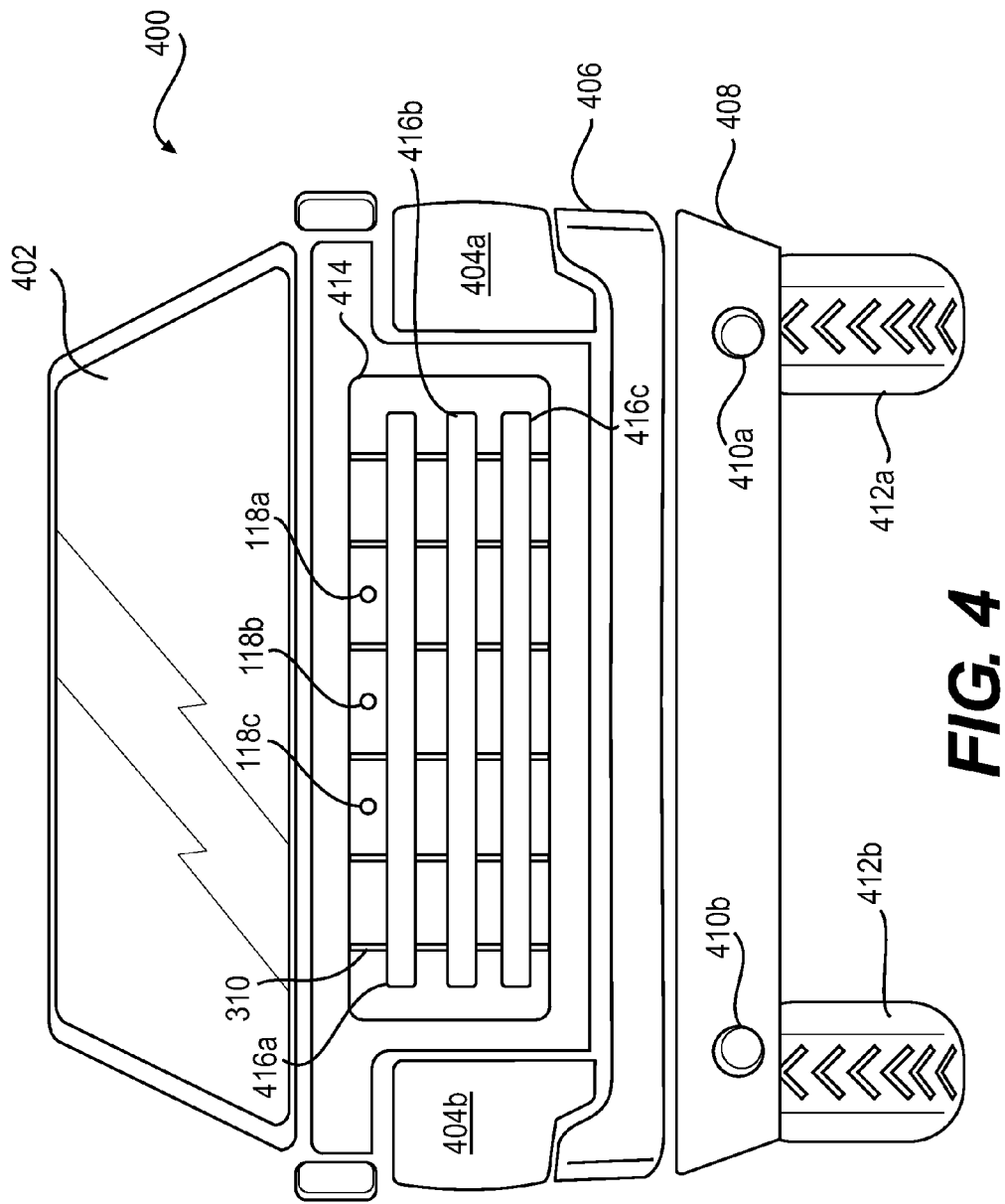
FIG. 4 illustrates a front exterior view of the truck of FIG. 3 with the first lamp mounting bracket assembled thereto and the lamps showing according to aspects of the embodiments.

According to aspects of the embodiments, design of lamp bracket 100 is such that it places the location of first mounting holes 106 in a position that coincides with existing grill mounting bolts 306. In this manner, first mounting holes 106 are located on lamp bracket 100 so that mounting bolt 306 of appropriate length and diameter can replace the existing mounting bolt so that lamp bracket 100 can be secured to grille portion 302 in a removably fixed manner, and the original function of the original grill bolts is retained. According to further aspects of the embodiments, the spacing and location of lamp mounting holes 104, and hence LED lamps 118 themselves, are such that they are co-located in grille openings so that they can be clearly seen when viewed from the front of the truck, as shown in FIG. 4. Wiring harness 200 has been omitted from the view of FIG. 3 in order to more clearly show the features of the attachment of assembled lamp bracket 100 to grille portion 302.

Turning now to FIG. 4, a front exterior view of the truck of FIG. 3 with first lamp mounting bracket 100 assembled thereto and LED lamps 118 can be seen according to aspects of the embodiments. Truck 400, in this non-limiting case, a 2014 Ford F150 truck, is shown and includes windshield 402, headlamp 404, first lower outer fascia 406, second lower outer fascia 408, fog lamp 408, tires 412, grille opening 414, and grille fascia rows 416. Many other details of a front view of truck 400 have been omitted in fulfillment of the dual purposes of clarity and brevity. Lamp bracket 100 has been located such that LED lamps 118a-c are visible (the LED lamps are shown in the lit condition) when viewed from the front of truck 400, and at a viewing angle of about 90° from a center line of truck 400. According to further aspects of the embodiments, lamp bracket 100 can be located such that it resides in the uppermost row above fascia row 416a, as it does in FIG. 4, or it can be located such that it is located between fascia rows 416a and 416b, or between fascia rows 416b and 416c, or below lowermost fascia row 416c.

According to further aspects of the embodiments, lamp bracket 100 can be made of such dimensions that it includes a greater plurality of LED lamps 118 (e.g., more than three LED lamps 118) that appear in more than one of the openings described above, e.g., the LED lamps can be seen above fascia row 416a and below fascia row 416b, and other combinations thereof. In these cases, lamp bracket 100 would be constructed in a substantially similar manner of attachment, and mounting hole and LED lamp hole placement to align with the grille openings as described above (in regard to FIG. 3), but could also include additional holes such that air could flow through to the radiator in the engine compartment, as described above. According to this aspect of the embodiments, wiring harness 200 could be suitably modified, again to turn all the LED lamps 118 on/off simultaneously, or could be adapted to create different lighting patterns using a microprocessor control board, and a simple user interface. Such microprocessor control boards are known to those of skill in the art; the programming of such control board to control the lighting of the LED lamps 118 can be such that a user could select from one of several different lighting patterns, at different on-off rates. Such programming capabilities are known to those of skill of the art, but the particular embodiment of such lamp bracket 100 with a microprocessor control board, and specifically designed and written programs are done in accordance with the various aspects of the embodiments.

In addition to the use of a microprocessor control board as described above, additional features in regard to LED lamps 118 can further be included with or without use of the microprocessor control board. According to aspects of the embodiments, LED lamps 118 can all be of uniform color, e.g., all red, green, or amber, among other colors. However, aspects of the embodiments are not limited thereto. Any and all colors available for different lamps can be incorporated into lamp bracket 100 according to further aspects of the embodiments. In addition, although LED lamp 118 has been described as encompassing a single color, it is possible there could be multiple color LEDs in a single LED lamp assembly 118, and thus additional programming capabilities, whether through actual programs or hard wired interconnections/circuitry, can provide for different color combinations within a single LED lamp assembly 118. For example, red, green, white and blue LEDs are now known to be available. A red and blue LED can be combined in one LED lamp assembly to create a purple light. The light intensity can be changed as well, by changing the relative intensity of one LED in view of the other (e.g., a different shade of purple can be created by making the red or blue LED brighter than the other). According to further aspects of the embodiments, different blinking and color patterns can be generated, with perhaps innumerable variations, according to aspects of the embodiments.

Figure 5:
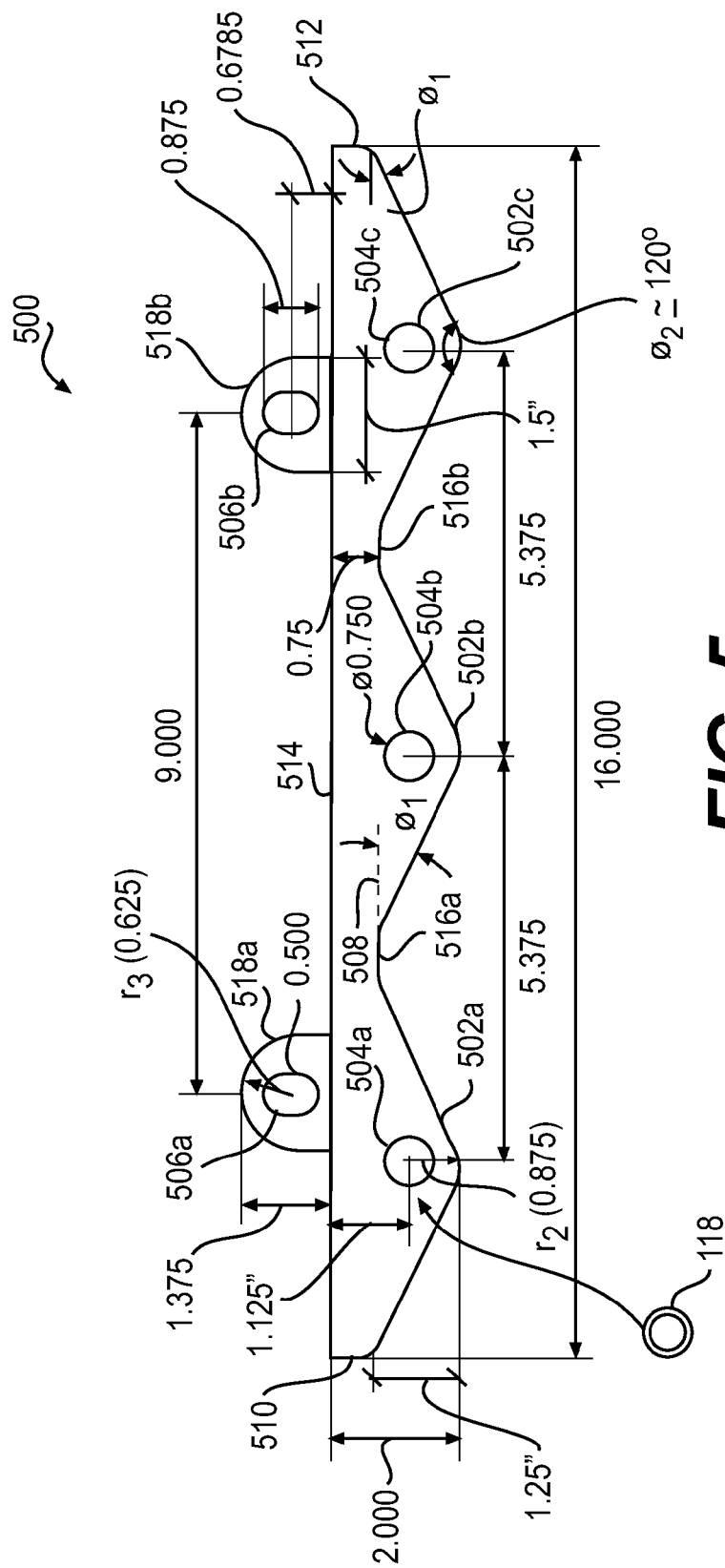
FIG. 5 illustrates a second lamp mounting bracket for use on a second truck according to aspects of the embodiments.

FIG. 5 illustrates second lamp mounting bracket (lamp bracket) 500 for use on a second truck such as a 2015 Ford F150 truck according to aspects of the embodiments. Lamp bracket 500, as briefly described above, can be used to hold a plurality of lamps in order to make the vehicle to which it is attached more visible during the day and night. According to an aspect of the embodiments, LEDs can be used as the lamps, as they draw relatively little power, last a very long time, and generate a very bright and visible light. Substantially similar LEDs can be used in lamp bracket 500 as can be used in lamp bracket 100, with substantially similar specifications, and thus in fulfillment of the dual purposes of clarity and brevity, a detailed description thereof need not be repeated again here. Lamp bracket 500, as described herein, and which the drawings included herein will show, is designed to be used with a 2015 Ford 150 truck; however, as can be appreciated by those of skill in the art, lamp bracket 500 can be used with other trucks and cars, or even other motorized vehicles, such as construction equipment, boats, and the like. Lamp bracket 500, described below in regard to FIGS. 5 and 6, can be made of steel, anodized aluminum, plastic, or other materials. The material lamp bracket 500 is constructed from need only be sufficiently strong to be relatively rigid, and to be able to securely hold the lamps; as those of skill in the art can appreciate, lamp bracket 500 will be subjected to a strong force generated from the oncoming air as the motorized vehicle to which it is attached travels. In lamp bracket 500 there are shown several holes for mounting and holding items; according to aspects of the embodiments, each of the holes used and illustrated can be in the form of a substantially circular, oval, or slot-shaped hole. In addition, non-limiting examples are provided herein of distances between these holes and various other components or parts of lamp bracket 500; it is to be understood that unless otherwise stated, such distances are taken from a center point of the hole to the particular feature or portion of the lamp bracket 500 that is being used as a reference point.

Figure 6:
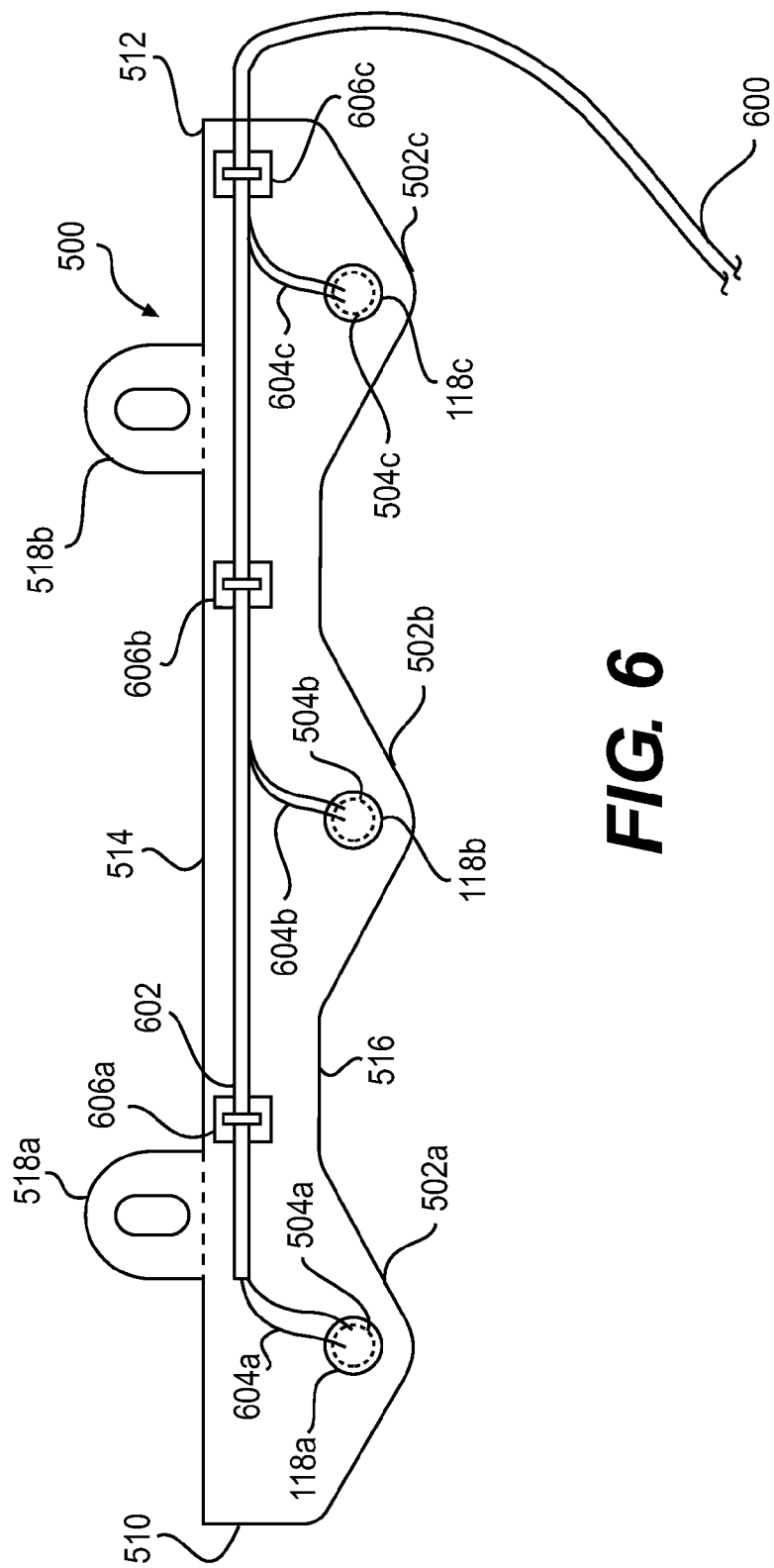
FIG. 6 illustrates the second lamp mounting bracket of FIG. 5 with a harness assembly according to aspects of the embodiments.

Lamp bracket 500 comprises substantially planar top portion 514, left side 510, right side 512, bracket mounting tabs 518a,b, a plurality of bottom portions 516a,b, and a plurality of lamp holding protrusions 502. According to aspects of the embodiments, left side 510 is substantially parallel to right side 512, and each of left and right sides 510, 512, are substantially perpendicular to top portion 514 and bottom portions 516a,b of lamp bracket 100. Lamp bracket 500 further includes mounting holes 506a,b, that are located in bracket mounting tabs 518a,b, respectively. There are three lamp holding protrusions 502a,b,c, and each are formed as shown in a substantially isosceles triangle fashion, with a lamp mounting hole 504a,b,c located in a central location, with the dimensions shown, in each of the respective lamp holding protrusions 502a,b,c. Lamps 118 can be fit into each of the lamp mounting holes 504a,b,c, as shown in FIG. 6, described below.

As shown in FIG. 5 and several other drawings, and described herein, lamp bracket 500 includes several different features. Lamp bracket 500 is shown and described according to aspects of the embodiments as incorporated a certain specific number of these components. For example, according to aspects of the embodiments, there are three lamp holding protrusions 502a-c, three lamp mounting holes 504a-c, and two mounting holes 506a,b. Those of skill in the art should appreciate that the aspects of the embodiments are not limited to these specific numbers of the features of lamp bracket 500; that is, other combinations of numbers of these and other components/features are considered to be within the scope of the aspects of the embodiments.

The peaks of each of lamp holding protrusions 502a,b,c are rounded, with a radius $r_2$ of about 0.8750", and the radius $r_2$ of each of the peaks can range from about 0.7875" to about 0.9625". The peaks of each of lamp holding protrusions 502a-c are formed at an angle $\Phi_2$ of about 120°, and $\Phi_2$ can range from about 108° to about 132°. The sides of lamp holding protrusions 502a,b,c are formed at an angle $\Phi_1$ of about 30° with respect to lower reference line 508, which is substantially co-linear with bottom portion 516. The angle $\Phi_1$ can range from 27° to about 33°. The height of each of each of protrusions 502a-c is about 1.25" and this height can range from about 1.125" to about 1.375". Lamp mounting holes 504a-c have a diameter of about 0.75" and the diameter can range from about 0.675" to about 0.825". Each of the lamp mounting holes 504a-c are located at a distance of about 1.125" from the uppermost surface of top portion 514 as shown in FIG. 5, and this distance can range from about 1.0125" to about 1.2375". The distance from the uppermost surface of top portion 514 to bottom portion 516 is about 0.75 ", and this distance can range from about 0.675" to about 0.825". According to an aspect of the embodiments, lamp bracket 500 is made from aluminum, and is about 0.063" in thickness; the thickness of lamp bracket can range from about 0.063"+/−10% in thickness to about 0.125" in thickness, +/−10%. The total height of lamp bracket 500 is about 2.0" and can range from about 1.8" to about 2.2". According to further aspects of the embodiments, different plastics (or other materials) can also be used to manufacture lamp bracket 500, as those of skill in the art can appreciate that different types of plastic would have the requisite hardness and stiffness, as described above.

Lamp bracket 500 can be used with a specific vehicle, a 2015 Ford 150 truck, though other uses are possible and should be considered to be included in various aspects of the embodiments. As lamp bracket 500 is designed to be used with a 2015 Ford F150 truck, the dimensions shown in FIG. 5 have been selected so that light emitting diode (LED) lamps 118 are located in openings in the front hood grille of the 2015 Ford 150 truck, and can be substantially clearly seen at great distances (about 500 feet), thereby providing enhanced visibility. As those of skill in the art can appreciate, other types of lamps can be used, including, but not limited to, incandescent bulbs, halogen, among others.

According to aspects of the embodiments, the overall length of lamp bracket 500 is about 16", and the length can range from about 14.4" to about 17.6". The distance between mounting holes 506a and 506b is about 9.0" and can range from about 8.1" to about 9.9". The height (or length) of each of the mounting holes 506a,b is about 0.875" and this height can range from about 0.7875" to about 0.9625". The width of each of the mounting holes 506a,b is about 0.5" and this width can range from about 0.45" to about 0.55". The center point of each of the mounting holes 506a,b is located about 0.6785" from top portion 514, and the location can range from about 0.6107" to about 0.7464". Each of the mounting holes 506a,b is located on respective mounting tabs 518a,b, the mounting tabs having an upper radius $r_3$ of about 0.625", and wherein radius $r_3$ can range from about 0.5625" to about 0.6875". Each of mounting tabs 518a,b are about 1.375" in height, and the height can range from about 1.2375" to about 1.5125", and the width of each of mounting tabs 518a,b is about 1.5" in width, and this width can range from about 1.35" to about 1.65". According to further aspects of the embodiments, mounting tabs 518a,b are located at a distance of about 9.0" from each other, and this distance can range from about 8.1" to about 9.9". According to still further aspects of the embodiments, each of mounting tabs 518a,c are substantially symmetrically located about a centerline of lamp bracket 500 (not shown), and thus are also substantially equidistantly located from respective left and right sides 510, 512.

In addition, as lamp bracket 500 is substantially symmetrical, bracket mounting holes 506a,b are substantially symmetrically located about an imaginary center line (not shown), and are located about 9.0" from each other. Due to this symmetry, each of first and second mounting holes 506a,b are also equidistantly located from left and right sides 510, 512, respectively.

Further still, because of this symmetry, lamp mounting holes 504a,c are also substantially symmetrically located about the imaginary center line that runs through about the center of lamp mounting hole 504b. According to further aspects of the embodiments, lamp mounting holes 504a,c are about 5.375" from the imaginary center line, and this distance can range from about 4.8375" to about 5.9125". Thus, due to this symmetry, each of bracket mounting holes 506 and lamp mounting holes 504a,c are also substantially equally distantly located from left and right sides 510, 512, respectively. Lamp mounting holes 504a-c each have a diameter of about 0.75", and the diameter can range from about 0.675" to about 0.825". The total height of lamp bracket 500 is about 2.0" and can range from about 1.8" to about 2.2".

FIG. 6 illustrates lamp bracket 500 with wiring harness assembly second bracket (wiring harness) 600 according to aspect of the embodiments. Wiring harness 600 carries voltage, typically +12 volts (V) direct current (DC), and return ground to each LED lamp assembly 118 located on lamp bracket 500. Wiring harness 600 comprises outer shield 602 and lamp cables 604a-c; as those of skill in the art can appreciate, there can be three separate cables 604 contained within wiring harness 600, all of which can be located within outer shield 602 and connected together appropriately at a source voltage and ground point within the engine compartment of the motorized vehicle. Or, as those of skill in the art can further appreciate, wiring harness 600 can comprises a single pair of appropriately sized wires that are spliced at the appropriate points to create each of the separate lamp cables 604a-c. The former arrangement has the advantage of being able to switch each of the LED lamps on/off separately from each other, which can be a desired feature (e.g., they can blink in unison, or separately, in patterns, or simply be turned on and off collectively). These features are described in greater detail below. The latter arrangement is a less costly item to manufacture and implement within wiring harness 600, but in this case LED lamps 118 can only be turned on/off together. Wiring harness 600 further includes a plurality of harness mounting clamp assemblies 606 that include an adhesive-backed base portion and a cable-tie securing portion to which a cable tie can be secured thereto to keep wiring harness 600 fixed in place on lamp bracket 500, in a manner known to those of skill in the art. In use, an installer would remove a non-stick piece of paper off the surface with the adhesive, and affix the base portion to an appropriate location on lamp bracket 500. Wiring harness 600 is then located close to the base portion, and a cable tie is wrapped around it and through the securing portion of the base portion, and tightened. According to further aspects of the embodiments, outer shield 602 can be a plastic, or nylon sleeve, or can be made of some other suitable material, such as a shrink-wrap cable. Water-proofing materials can also be applied in a manner known to those of skill in the art at appropriate locations to protect the terminals of LED lamps 118.

Each of LED lamp mounting holes 504a-c are of such appropriate size such that LED lamps 118a-c can be press fit into each of them. Alternatively, other type of LED lamps 118 can include a rubber or nylon washer (or one made from other materials), grommet, and nut assembly, such that the grommet is first located into a particular mounting hole 504, washers are located on a front and rear side of lamp bracket 500, and the LED lamp is inserted through mounting hole 504. A nut can then be placed on a threaded portion of LED lamp 118 and tightened appropriately. These and other means for mounting LED lamps 118 to lamp bracket 500 are considered to be within the scope of the various aspects of the embodiments.

For example, lamp bracket 500 can be an assembly made up of several components: a mounting portion, a printed circuit board (PCB) portion, and a shield/weather-proofing portion or cover. These components can be attached to each with nuts and bolts, or screws, or in other manners so that they are effectively kept together as an assembly. LED lamps 118 can be attached to the PCB through conventional PCB manufacturing techniques, and the PCB can further include circuit conduits (or "runs") manufactured through known processes. The circuit conduits can provide voltage and ground to LED lamps 118 from an interconnection located on the PCB to which mating connector (from a supply cable) can be attached. The shield layer can be a separate physical shield, with substantially waterproof and weatherproof characteristics, such that the PCB is effectively shielded from water, dirt, dust and other detritus that can damage LED lamps 118 and the PCB. Although the individual manufacturing techniques are known to those of skill in the art, the implementation of the components and their physical location and placement are in accordance with the various aspects of the embodiments.

Lamp bracket 500 has been designed for use with a 2015 Ford F150 truck, though, as described above, it can be used with other motorized vehicles, in a substantially similar manner that lamp bracket 100 can be used in other motorized vehicles. As can now be understood from the description and drawing Figures provided herein, lamp bracket 500 is substantially similar in function and layout to that of lamp bracket 100. Thus, while FIG. 3 has been provided (and description provided) to illustrate assembly of lamp bracket 100 onto a grille area of a truck hood as viewed from an engine compartment and FIG. 4 has been provided (and description provided) to illustrate a front exterior view of the truck of FIG. 3 with lamp bracket 100 assembled thereto and lamps 118 illuminated, in fulfillment of the dual purposes of clarity and brevity, the same has not been provided in regard to lamp bracket 500 due to its similar nature to that of bracket 100 according to aspects of the embodiments. In addition, the discussion above in regard to different features of lamp bracket 100 according to aspects of the embodiments (e.g., placement of lamp bracket 100, the number of LED lamps 118, the inclusion of a processor board to control on/off sequencing of LED lamps 118, among other features) applies substantially equally to lamp bracket 500, and thus in fulfillment of the dual purposes of clarity and brevity, such additional discussion and description has been omitted from herein.

Figure 7A:
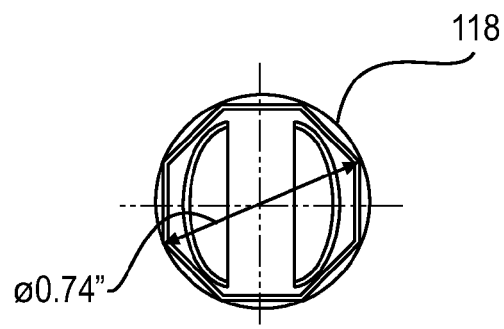
FIGS. 7A and 7B illustrate a top view and a side view of a light emitting diode lamp assembly that can be used with the first and second lamp mounting brackets according to aspects of the embodiments.
Figure 7B:
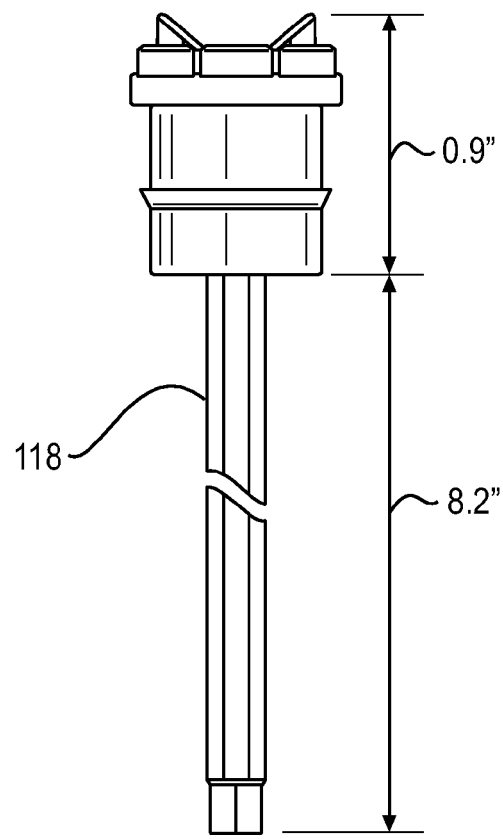

FIGS. 7A and 7B illustrate a top view and a side view of LED lamp assembly 118, respectively, which can be used with first and second lamp mounting brackets 100, 500 according to aspects of the embodiments. LED lamp assembly 118 (with the LED as part of the assembly) as shown in FIGS. 7A and 7B, is manufactured by Blazer International as part number 534Bak or UL118CA, located at 6700 Wildlife Way, Long Grove, Ill., 60047. As described above, other lamps can be used as well, including, but not limited to, halogen, incandescent, and fluorescent bulbs, among others, according to aspects of the embodiments.

As discussed in regard to the Figures, reference is made to several dimensions, including several radii, angles, distances, thicknesses, heights, among others. Those of skill in the art can appreciate that although examples of dimensions are provided, these should not be taken in a limiting manner; that is, the aspects of the embodiments are not to be construed as defined or limited by the specific example of the dimensions shown and discussed, but instead are provided merely for illustrating an example of what a device that incorporates the aspects of the embodiments could, in a non-limiting manner, look like. Furthermore, as those of skill in the art can appreciate, since the aspects of the embodiments are directed towards a physical object, with dimensional characteristics, all of the parts will have various dimensions, some of which are not shown in fulfillment of the dual purposes of clarity and brevity. According to still further aspects of the embodiments, some of these objects will have dimensional characteristics that lend themselves to aesthetic aspects; in fulfillment of the dual purposes of clarity and brevity, dimensions in this regard have also been omitted. Therefore, as the aspects of the embodiments are directed towards a lamp bracket for holding lamps, while the lamp brackets are characterized and described as being attached to a motorized vehicle, such as a truck, it is to be understood that the dimensions of the different objects, some dimensions shown, some dimensions not shown, will be understood by those of skill in the art.

As can be further appreciated by one skilled in the art, the various functional aspects of the embodiments of lamp brackets 100 and 500 can be embodied in an fully or semi-automated system driven in whole or in part by one or more processors, as described above. Accordingly, the embodiments can take the form of an entirely hardware embodiment or an embodiment combining hardware and software aspects.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media.

Computer storage media includes volatile and nonvolatile as well as removable and non-removable media implemented in any method or technology for storage of information such as computer readable instructions, data structures, program modules or other data. Computer storage media includes, but is not limited to, random access memory (RAM), read only memory (ROM), electrically erasable programmable read only memory (EEPROM), flash memory, ultra-violet programmable read only memory (UVPROM), or other memory technology, compact disk (CD) ROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as ROM and/or RAM. A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable, volatile/nonvolatile, and transitory/non-transitory computer storage media. For example, the processor can access a hard disk drive (HDD) that reads from or writes to non-removable, nonvolatile, and non-transitory magnetic media, a magnetic disk drive that reads from or writes to a removable, nonvolatile, and non-transitory magnetic disk, and/or an optical disk drive that reads from or writes to a removable, nonvolatile, and non-transitory optical disk, such as a CD-ROM or other optical media. Other removable/non-removable, volatile/nonvolatile, and non-transitory computer storage media that can be used in the operating environment include, but are not limited to, magnetic tape cassettes, flash memory cards, digital versatile disks, digital video tape, solid state RAM, solid state ROM and the like. A HDD can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. A non-limiting list of examples of the computer-readable recording medium includes a HDD, ROM, RAM, CD-ROMs, optical data storage devices, magnetic tapes, flash drives, and floppy disks. The computer-readable recording medium can also be distributed over network coupled computer systems so that the computer-readable code is stored and executed in a distributed fashion (e.g., the "cloud"). The computer-readable transmission medium can transmit carrier waves or signals (e.g., wired or wireless data transmission through the Internet). Furthermore, programmers of ordinary skill in the art to which the embodiments pertain can generate functional programs, codes, and code segments, in suitable electronic hardware, to accomplish or support exercising certain elements of the appended claims.

The disclosed embodiments provide a first and second lamp bracket 100, 500 for use with a 2014 Ford F150 truck, and a 2015 Ford F150 truck, although their use in other motorized vehicles is considered to be within the scope of the various aspects of the embodiments. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments can be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and can include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

I claim:

1. A lamp bracket assembly (100,500) for use with a motorized vehicle fashioned from a sheet of material, the lamp bracket assembly comprising:
    a top, substantially flat portion (114,514);
    a left side (110,510);
    a right side (112,512); and
    three lamp holding protrusions (102,502), of substantially isosceles triangle shape, located at a bottom portion of the lamp bracket assembly, each of the three lamp holding protrusions including respective lamp mounting holes (104,504), the location of the lamp holding holes and dimensions of the three lamp holding protrusions being such that to cause lamps (118) located in respective ones of the lamp holding holes to be visible through grille openings located on a hood assembly of the motorized vehicle when the lamp bracket assembly is attached to the grille of the motorized vehicle.

2. The lamp bracket assembly according claim 1, further comprising:
    a plurality of lamp bracket assembly mounting holes (106) located such that their position on the lamp bracket assembly provides for the lamp bracket assembly to be mounted on the motorized vehicle to allow the lamps to be visible through grille openings on the hood assembly of the motorized vehicle.

3. The lamp bracket assembly according claim 2, wherein each of the plurality of lamp bracket assembly mounting holes (106) comprises:
    a slot, wherein each of the slots is characterized by a long dimension of about 0.875" substantially parallel with the top, substantially flat portion of the lamp bracket assembly and the slot further characterized by a short dimension of about 0.313" substantially perpendicular to the top substantially flat portion of the lamp bracket assembly, and wherein
    first and second slots are located about 11.688" from each other, and are substantially symmetrically located about a center line of the lamp bracket assembly, and further wherein the first and second slot are located about 0.594" from the top substantially flat portion of the lamp bracket assembly.

4. The lamp bracket assembly according claim 1, further comprising
   a bottom portion (116), the bottom portion being substantially parallel to the substantially flat top portion, and wherein
      each of the lamp holding protrusions are substantially equidistantly located from each other at a distance of about 6.781", protrude outwardly in a planar manner from the bottom portion, and are substantially symmetrically located about a center line of the lamp bracket assembly, and further wherein
      the two substantially similar length sides of the lamp holding protrusions are formed at an angle of about 30° with respect to a base side of the isosceles shaped lamp holding protrusion that is also substantially parallel to, and in line with, the bottom portion of the lamp bracket assembly, and further wherein
   each of the lamp holding protrusions has a height of about 1.236" in reference to the bottom portion of the lamp bracket assembly.

5. The lamp bracket assembly according claim 4, wherein
   each of the respective lamp mounting holes (104) are located about on a center line of their respective lamp holding protrusion, at a distance of about 1.938" from the top substantially flat portion of the lamp bracket assembly, and
   are substantially equidistantly located at about a distance of about 6.781" from each other, and still further wherein
   the bottommost portion of the lamp holding protrusion is formed at an angle of about 120°, with a radius of about 0.625".

6. The lamp bracket assembly of claim 5, wherein
   the left side is substantially parallel to the right side, and each of the left and right sides are substantially perpendicular to the top portion of the lamp bracket assembly, and wherein
   the lamp bracket assembly is about 18" in length, and further wherein
   a height of the lamp bracket assembly, as measured from the top portion to each of the bottommost portion of the lamp holding protrusions is about 2.736", and still further wherein
   a distance from the top portion to the bottom portion is about 1.5", and still further wherein
   a diameter of each of the lamp mounting holes is about 0.75".

7. The lamp bracket assembly according to claim 1, wherein the motorized vehicle comprises:
   a 2014 Ford F150 pickup truck.

8. The lamp bracket assembly according to claim 1, further comprising:
   a pair of second bracket mounting holes, wherein
      each of the first and second bracket mounting holes are located about 11.686" apart from each, and are substantially symmetrically located about a center line of the lamp bracket assembly, and further wherein
      each of the pair of second bracket mounting holes are located about 1.125" from the top portion of the lamp bracket assembly, and further wherein
      each of the pair of second bracket mounting holes are about 0.375" in diameter.

9. The lamp bracket assembly according to claim 8, wherein the motorized vehicle is selected from the group consisting of 2014 Ford Platinum, Limited, and King Ranch model F150s.

10. The lamp bracket assembly according to claim 1, further comprising:
    a lamp lighting harness assembly that includes
    a plurality of light emitting diodes (LEDs) lamps,
       a plurality of wires carrying direct current voltage and return ground to each of the LED lamps, and further wherein
          the lamp harness assembly can connect each of the LED lamps to a first processor based controller, wherein the controller is adapted to cause the LED lamps to illuminate in certain patterns.

11. The lamp bracket assembly according claim 1, further comprising:
    one or more lamp bracket mounting tabs (518), wherein,
       each of the one or more lamp bracket mounting tabs includes at least one lamp bracket assembly mounting openings (506) located such that their position on the lamp bracket assembly provides for the lamp bracket assembly to be mounted on the motorized vehicle to allow the lamps to be visible through grille openings on the hood assembly of the motorized vehicle.

12. The lamp bracket assembly according claim 11, wherein each of the plurality of lamp bracket assembly mounting openings (506) comprises:
    a slot, wherein each of the slots is characterized by a long dimension of about 0.875" substantially perpendicular to the top substantially flat portion of the lamp bracket assembly and the slot further characterized by a short dimension of about 0.5" substantially parallel to the top substantially flat portion of the lamp bracket assembly, and wherein
       the first and second slots are located about 9.0" from each other and substantially symmetrically about a center line of the lamp bracket assembly, and further wherein
       the first and second slots are located about 0.6875" from the top substantially flat portion of the lamp bracket assembly.

13. The lamp bracket assembly according to claim 11, wherein each of the lamp bracket mounting tabs
    has an upper radius of about 0.625",
    a height of about 1.375",
    a width of about 1.5",
    are located at a distance of about 9.0" from each other,
    are substantially symmetrically located about a centerline of the lamp bracket assembly, and
    are substantially equidistantly located from respective left and right sides (510, 512).

14. The lamp bracket assembly according claim 1, further comprising
    a bottom portion (516), the bottom portion substantially parallel to the substantially flat top portion, and wherein
       the lamp holding protrusions are substantially equidistantly located from each other, protruding in a planar manner from the bottom portion, at about 5.375", and are substantially symmetrically located about a center line of the lamp bracket assembly, and further wherein
       the two substantially similar length sides of the lamp holding protrusions are formed at an angle of about 30° with respect to a base side of the isosceles shaped lamp holding protrusion that is also substantially parallel to, and in line with, the bottom portion of the lamp bracket assembly, and further wherein each of the lamp holding protrusions has a height of about 1.25" in reference to the bottom portion of the lamp bracket assembly.

15. The lamp bracket assembly according claim 14, wherein each of the respective lamp holding holes (504) are located on a center line of their respective lamp holding protrusion, and are substantially equidistantly located from each other at a distance of about 5.375", and still further wherein the bottommost portion of the lamp holding protrusion is formed at an angle of about 120°, with a radius of about 0.875".

16. The lamp bracket assembly of claim 15, wherein the left side is substantially parallel to the right side, and each of the left and right sides are substantially perpendicular to the top portion of the lamp bracket assembly, and wherein the lamp bracket assembly is about 16" in length, and further wherein a height of the lamp bracket assembly, as measured from the top portion to each of the lamp holding protrusions is about 2.0", and still further wherein a distance from the top portion to the bottom portion is about 0.75", and still further wherein a distance from the top portion to a center of each of the lamp mounting holes is about 1.125", and still further wherein, a diameter of each of the lamp mounting holes is about 0.75".

17. The lamp bracket assembly according to claim 1, wherein the motorized vehicle comprises:

a 2015 Ford F150 pickup truck.

18. A lamp bracket assembly (100) for use with a motorized vehicle fashioned from a sheet of material, the lamp bracket assembly comprising:

a top, substantially flat portion (114);
a left side (110);
a right side (112), and wherein
the left side is substantially parallel to the right side, and each of the left and right sides are substantially perpendicular to the top portion of the lamp bracket assembly, and further wherein
the lamp bracket assembly is about 18" in length;
three lamp holding protrusions (102) of substantially isosceles triangle shape, located at a bottom portion of the lamp bracket assembly, each of the three lamp holding protrusions including respective lamp mounting holes (104), the location of the lamp holding holes and dimensions of the three lamp holding protrusions being such that to cause lamps (118) located in respective ones of the lamp holding holes to be visible through grille openings located on a hood assembly of the motorized vehicle when the lamp bracket assembly is attached to the grille of the motorized vehicle;
two first bracket mounting holes (106) located such that their position on the lamp bracket assembly provides for the lamp bracket assembly to be mounted on the motorized vehicle to allow the lamps to be visible through grille openings on the hood assembly of the motorized vehicle, wherein
each of the pair of first bracket mounting holes (106) comprises a slot, wherein each of the slots is characterized by a long dimension of about 0.875" substantially parallel with the top, substantially flat portion of the lamp bracket assembly and the slot further characterized by a short dimension of about 0.313" substantially perpendicular to the top substantially flat portion of the lamp bracket assembly, and wherein first and second slots are located about 11.688" from each other, and are substantially symmetrically located about a center line of the lamp bracket assembly, and further wherein the first and second slot are located about 0.594" from the top substantially flat portion of the lamp bracket assembly, and wherein the pair of first mounting holes is adapted to mount the lamp bracket assembly to a 2014 Ford F150 truck;

a bottom portion (116), the bottom portion being substantially parallel to the substantially flat top portion, and a distance from the top portion to the bottom portion is about 1.5", and wherein each of the lamp holding protrusions are substantially equidistantly located from each other at a distance of about 6.781", protrude outwardly in a planar manner from the bottom portion, and are substantially symmetrically located about a center line of the lamp bracket assembly, and further wherein the two substantially similar length sides of the lamp holding protrusions are formed at an angle of about 30° with respect to a base side of the isosceles shaped lamp holding protrusion that is also substantially parallel to, and in line with, the bottom portion of the lamp bracket assembly, and further wherein each of the lamp holding protrusions has a height of about 1.236" in reference to the bottom portion of the lamp bracket assembly, and still further wherein each of the respective lamp mounting holes (104) are located about on a center line of their respective lamp holding protrusion, at a distance of about 1.938" from the top substantially flat portion of the lamp bracket assembly, and are substantially equidistantly located at about a distance of about 6.781" from each other, and wherein each of the lamp mounting holes has a diameter of about 0.75" and still further wherein the bottommost portion of the lamp holding protrusion is formed at an angle of about 120°, with a radius of about 0.625", and a height of the lamp bracket assembly, as measured from the top portion to a bottommost portion of each of the lamp holding protrusions is about 2.736";

a lamp lighting harness assembly (200) that includes
three light emitting diodes (LEDs) lamps, and
a plurality of wires carrying direct current voltage and return ground to each of the three LED lamps; and a pair of second bracket mounting holes (107), wherein
the pair of second bracket mounting holes are located about 11.686" apart from each, and are substantially symmetrically located about a center line of the lamp bracket assembly, and further wherein each of the pair of second bracket mounting holes are located about 1.125" from the top portion of the lamp bracket assembly, and further wherein each of the pair of second bracket mounting holes are about 0.375" in diameter, and wherein the pair of second bracket mounting holes are adapted to mount the lamp bracket assembly to a motorized vehicle selected from the group consisting of 2014 Ford Platinum, Limited, and King Ranch model F150s, such that when so mounted using the second bracket mounting holes, the location of the lamp holding holes and dimensions of the three lamp holding protrusions are such that the lamps (118) located in respective ones of the lamp holding holes are visible through grille openings located on a hood assembly of one of the group of motorized vehicles when the lamp bracket assembly is attached to the grille of one of the motorized vehicles.

19. A lamp bracket assembly (500) for use with a motorized vehicle fashioned from a sheet of material, the bracket assembly comprising:
   a top, substantially flat portion (514);
   a left side (510);
   a right side (512), and wherein
      the left side is substantially parallel to the right side, and each of the left and right sides are substantially perpendicular to the top portion of the lamp bracket assembly, and further wherein
      the lamp bracket assembly is about 16" in length;
   three lamp holding protrusions (502) of substantially isosceles triangle shape, located at a bottom portion of the lamp bracket assembly, each of the three lamp holding protrusions including respective lamp mounting holes (504), the location of the lamp holding holes and dimensions of the three lamp holding protrusions being such that to cause lamps (118) located in respective ones of the lamp holding holes to be visible through grille openings located on a hood assembly of the motorized vehicle when the lamp bracket assembly is attached to the grille of the motorized vehicle;
   two lamp bracket mounting tabs (518), wherein,
      each of the one or more lamp bracket mounting tabs includes at least one lamp bracket assembly mounting openings (506) located such that their position on the lamp bracket assembly provides for the lamp bracket assembly to be mounted on the motorized vehicle to allow the lamps to be visible through grille openings on the hood assembly of the motorized vehicle, and wherein each of the plurality of lamp bracket assembly mounting openings (506) comprises
         a slot, wherein each of the slots is characterized by a long dimension of about 0.875" substantially perpendicular to the top substantially flat portion of the lamp bracket assembly and the slot further characterized by a short dimension of about 0.5" substantially parallel to the top substantially flat portion of the lamp bracket assembly, and wherein
      the first and second slots are located about 9.0" from each other and substantially symmetrically about a center line of the lamp bracket assembly, and further wherein
      the first and second slots are located about 0.6875" from the top substantially flat portion of the lamp bracket assembly, and wherein each of the two lamp bracket mounting tabs
   has an upper radius of about 0.625",
   a height of about 1.375",
   a width of about 1.5",
   are substantially symmetrically located about a centerline of the lamp bracket assembly, and
   are substantially equidistantly located from respective left and right sides (510, 512), and wherein
   the two lamp bracket mounting tabs are adapted to mount the lamp bracket assembly to a 2015 Ford F150 truck; and
   a bottom portion (516), the bottom portion substantially parallel to the substantially flat top portion, and wherein
      each of the three lamp holding protrusions are substantially equidistantly located at a distance of about 2.375" from each other, protrude outwardly in a planar manner from the bottom portion, and are substantially symmetrically located about a center line of the lamp bracket assembly, and further wherein
      the two substantially similar length sides of the lamp holding protrusions are formed at an angle of about 30° with respect to a base side of the isosceles shaped lamp holding protrusion that is also substantially parallel to, and in line with, the bottom portion of the lamp bracket assembly, and further wherein
      each of the lamp holding protrusions has a height of about 1.25" in reference to the bottom portion of the lamp bracket assembly, and wherein
      each of the respective lamp holding holes (504) are located on a center line of their respective lamp holding protrusion, and
         are substantially equidistantly located from each other at a distance of about 5.375", and still further wherein
         the bottommost portion of the lamp holding protrusion is formed at an angle of about 120°, with a radius of about 0.875", and further wherein
      a height of the lamp bracket assembly, as measured from the top portion to each of a bottommost portion of the lamp holding protrusions is about 2.0", and still further wherein
      a distance from the top portion to the bottom portion is about 0.75", and still further wherein
      a distance from the top portion to a center of each of the lamp mounting holes is about 1.125", and still further wherein,
      a diameter of each of the lamp mounting holes is about 0.75"; and
   a lamp lighting harness assembly (600) that includes three light emitting diodes (LEDs) lamps, and
      a plurality of wires carrying direct current voltage and return ground to each of the three LED lamps.

* * * * *